(12) United States Patent
Oosterhouse et al.

(10) Patent No.: US 11,979,551 B2
(45) Date of Patent: May 7, 2024

(54) STALE VIDEO DETECTION

(71) Applicant: GENTEX CORPORATION, Zeeland, MI (US)

(72) Inventors: Andrew J. Oosterhouse, Hudsonville, MI (US); Michael D. Zwagerman, Zeeland, MI (US); Tyler W. Blaum, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 50 days.

(21) Appl. No.: 17/850,266

(22) Filed: Jun. 27, 2022

(65) Prior Publication Data

US 2022/0417495 A1 Dec. 29, 2022

Related U.S. Application Data

(60) Provisional application No. 63/215,582, filed on Jun. 28, 2021.

(51) Int. Cl.
*H04N 17/00* (2006.01)
*H04N 5/77* (2006.01)

(52) U.S. Cl.
CPC ............ *H04N 17/00* (2013.01); *H04N 5/77* (2013.01)

(58) Field of Classification Search
CPC .......... H04N 17/00; H04N 5/783; H04N 5/77; H04N 7/18
See application file for complete search history.

(56) References Cited

U.S. PATENT DOCUMENTS

| | | | |
|---|---|---|---|
| 2006/0132622 | A1 | 6/2006 | Ama et al. |
| 2007/0091204 | A1 | 4/2007 | Koshimizu et al. |
| 2012/0044359 | A1 | 2/2012 | Voltz |
| 2016/0125245 | A1* | 5/2016 | Saitwal ............ G06T 7/136 382/173 |

FOREIGN PATENT DOCUMENTS

| | | |
|---|---|---|
| CN | 110475156 A | 11/2019 |
| JP | 2009225472 A1 | 10/2009 |

OTHER PUBLICATIONS

International Search Report dated Oct. 6, 2022, for corresponding PCT application No. PCT/US2022/035113, 3 pages.
Written Opinion dated Oct. 6, 2022, for corresponding PCT application No. PCT/US2022/035113, 3 pages.

* cited by examiner

*Primary Examiner* — Yassin Alata
(74) *Attorney, Agent, or Firm* — Price Heneveld LLP; Brian James Brewer

(57) ABSTRACT

A device and a corresponding system are disclosed. The device may comprise a display. Additionally, the device and/or system may be operable to detect stale images. Further, the stale images may be detected in devices and/or systems where incoming images—such as from an imager—are received at a frame rate different than that of the display. A controller may detect the stale images by assigning hash values to images of each frame displayed by the display; storing novel hash values in a memory; and maintaining a counter. The counter may be maintained such that assigning a repeat hash value increments the counter by one and assigning novel hash values resets the counter to zero. Further, the stale images may be determined based, at least in part, on the counter value.

20 Claims, 1 Drawing Sheet

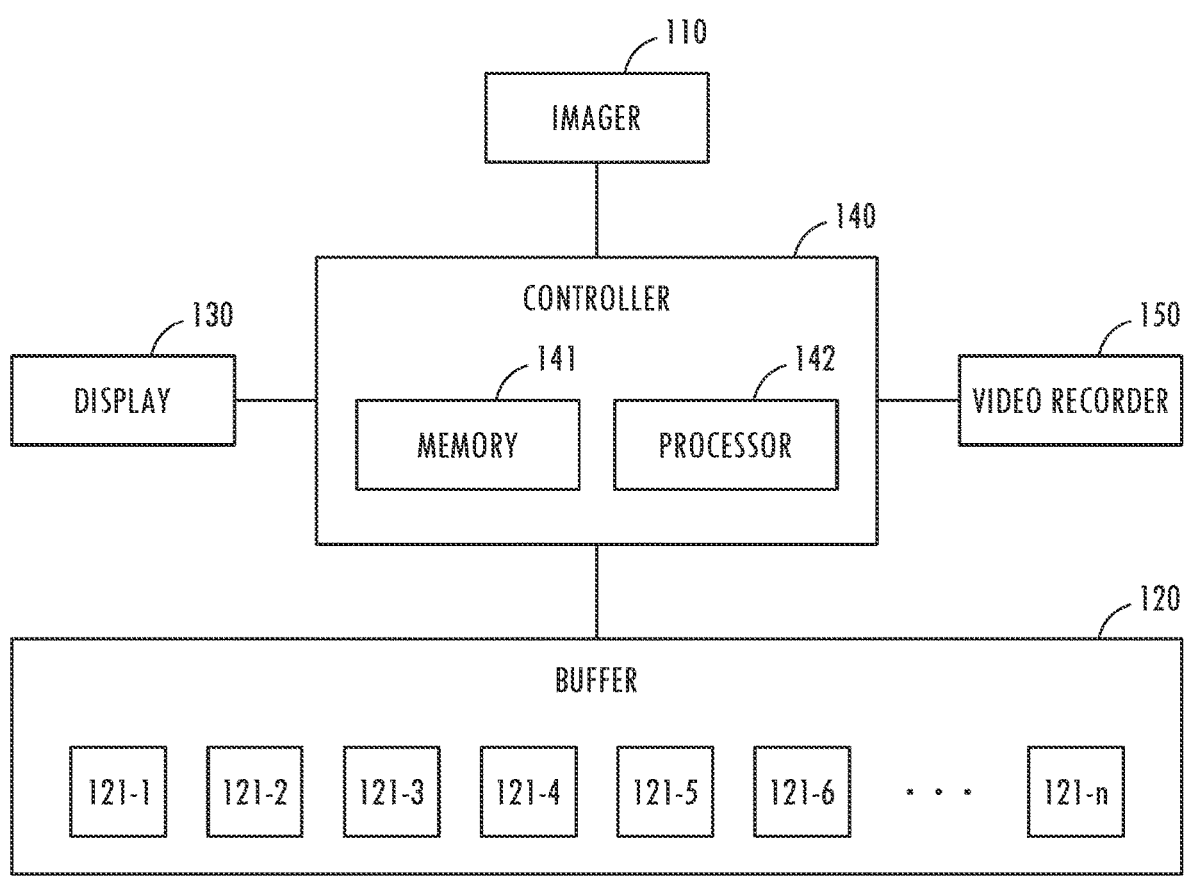

STALE VIDEO DETECTION

CROSS REFERENCE TO RELATED APPLICATIONS

This application claims priority under 35 U.S.C. § 119(e) to U.S. Provisional Application No. 63/215,582 filed on Jun. 28, 2021, entitled "STALE VIDEO DETECTION," the disclosure of which is hereby incorporated by reference in its entirety.

FIELD OF INVENTION

The present invention relates in general to video systems and, more particularly, to video systems operable to detect stale images.

BACKGROUND OF INVENTION

In some instances, a video system may erroneously present "stale video." Stale video generally means old video that have not been updated with new frames. This may be particularly problematic for displays incorporated into vehicle rearview assemblies. Specifically, presenting stale video to a vehicle occupant may pose significant safety risks. However, there are complications in ensuring stale video is not presented by vehicle video systems, because incoming framerates from cameras, such as rearview cameras or backup cameras, are often variable, but the display framerate maintains constant. Thus, the display and the cameras may have different frame rates at any given time. Accordingly, some repeated frames are expected when the frame rate of the display is greater than that of the camera, due to the display advancing to a new frame before a new image is received from the camera.

SUMMARY

In accordance with the present disclosure, the problems associated with stale video detection for systems where the camera and display may have different frame rates have been substantially reduced or eliminated.

According to one aspect, a system is disclosed. The system may comprise a camera, a buffer, a display, and/or a controller. The camera may be operable to capture a series of images at a first frame rate. In some embodiments, the first frame rate may be variable. The buffer may have a first number of memory storage slots. Additionally, the buffer may be operable to: at a frequency of time intervals, sequentially and cyclically store into the memory storage slots, the most current image received from the camera at each interval. The display may be operable to present images at a second frame rate, sequentially and cyclically from the memory storage slots. In some embodiments, the second frame rate may be greater than the first frame rate. Accordingly, the first frame rate may be less than the second frame rate. In some embodiments, the first number may be determined based, at least in part, on a highest expected ratio between the first and second frame rates. The controller may be operable to: assign hash values to images of each frame displayed by the display; store novel hash values in a memory; maintain a counter; and determine if one or more images in the buffer are stale. In some embodiments, the controller may be further operable to not store repeat hash values in the memory. In some embodiments, the memory may retain only a second number of the stored novel hash values such that only the most recent stored novel hash values are retained. The second number may be greater than or equal to the first number. The counter may be maintained such that assigning a repeat hash value increments the counter by one and assigning novel hash values resets the counter to zero. Further, the stale images may be determined based, at least in part, on the counter value. In some embodiments, the determination that one or more images in the buffer are stale may be further based, at least in part, on the counter value exceeding the first number. In some embodiments, the controller may be further operable to prevent stale images from being displayed by the display. Additionally or alternatively, the display may be operable to display a notification related to the determination of the buffer having one or more stale images.

In accordance with another aspect of the present disclosure, a device is disclosed. In some embodiments, the device may be a vehicular rearview assembly. Further, the device may comprise a display and a controller. The display may be operable to display images at a first frame rate. The controller may be operable to receive images at a second frame rate. In some embodiments, the images may be operably received from a camera having a field of view rearward relative a vehicle in which the device may be disposed. In some embodiments, the first and second frame rates may be different. Additionally, the second frame rate may be variable. Additionally, the controller may be further operable to, at an interval frequency, sequentially and cyclically store the most current received image in a buffer having a first number of memory storage slots. Additionally, the display may be further operable to display images sequentially and cyclically from the memory storage slots. Further, the controller may be operable to assign hash values to images of each frame displayed by the display; store novel hash values in a memory; maintain a counter; and determine if one or more images in the buffer are stale. In some embodiments, the controller may be further operable to not store repeat hash values in the memory. In some embodiments, the memory may retain only a second number of the stored novel hash values such that only the most recent stored novel hash values are retained. The second number may be greater than or equal to the first number. The counter may be maintained such that assigning a repeat hash value increments the counter by one and assigning novel hash values resets the counter to zero. Further, the stale images may be determined based, at least in part, on the counter value. In some embodiments, the determination that one or more images in the buffer are stale may be further based, at least in part, on the counter value exceeding the first number. In some embodiments, the controller may be further operable to prevent stale images from being displayed by the display. Additionally or alternatively, the display may be operable to display a notification related to the determination of the buffer having one or more stale images.

In accordance with another aspect, a system is disclosed. The system may comprise a camera, a buffer, a video recorder, and/or a controller. The camera may be operable to capture a series of images at a first frame rate. In some embodiments, the first frame rate may be variable. The buffer may have a first number of memory storage slots. Additionally, the buffer may be operable to: at a frequency of time intervals, sequentially and cyclically store into the memory storage slots, the most current image received from the camera at each interval. The video recorder may be operable to record images at a second frame rate, sequentially and cyclically from the memory storage slots. In some embodiments, the second frame rate may be greater than the first frame rate. Accordingly, the first frame rate may be less than the second frame rate. In some embodiments, the first number may be determined based, at least in part, on a highest expected ratio between the first and second frame rates. The controller may be operable to: assign hash values to images of each frame recorded by the video recorder; store novel hash values in a memory; maintain a counter; and determine if one or more images in the buffer are stale. In some embodiments, the controller may be further operable to not store repeat hash values in the memory. In some embodiments, the memory may retain only a second number of the stored novel hash values such that only the most recent stored novel hash values are retained. The second number may be greater than or equal to the first number. The counter may be maintained such that assigning a repeat hash value increments the counter by one and assigning novel hash values resets the counter to zero. Further, the stale images may be determined based, at least in part, on the counter value. In some embodiments, the determination that one or more images in the buffer are stale may be further based, at least in part, on the counter value exceeding the first number. In some embodiments, the controller may be further operable to prevent stale images from being recorded by the video recorder. Additionally or alternatively, the video recorder may be operable to record a notification related to the determination of the buffer having one or more stale images.

In accordance with yet another aspect of the present disclosure, a device is disclosed. In some embodiments, the device may be a vehicular rearview assembly. Further, the device may comprise a video recorder and a controller. The video recorder may be operable to record images at a first frame rate. The controller may be operable to receive images at a second frame rate. In some embodiments, the images may be operably received from a camera having a field of view rearward relative a vehicle in which the device may be disposed. In some embodiments, the first and second frame rates may be different. Additionally, the second frame rate may be variable. Additionally, the controller may be further operable to, at an interval frequency, sequentially and cyclically store the most current received image in a buffer having a first number of memory storage slots. Additionally, the video recorder may be further operable to record images sequentially and cyclically from the memory storage slots. Further, the controller may be operable to assign hash values to images of each frame recorded by the video recorder; store novel hash values in a memory; maintain a counter; and determine if one or more images in the buffer are stale. In some embodiments, the controller may be further operable to not store repeat hash values in the memory. In some embodiments, the memory may retain only a second number of the stored novel hash values such that only the most recent stored novel hash values are retained. The second number may be greater than or equal to the first number. The counter may be maintained such that assigning a repeat hash value increments the counter by one and assigning novel hash values resets the counter to zero. Further, the stale images may be determined based, at least in part, on the counter value. In some embodiments, the determination that one or more images in the buffer are stale may be further based, at least in part, on the counter value exceeding the first number. In some embodiments, the controller may be further operable to prevent stale images from being recoded by the video recorder. Additionally or alternatively, the video recorder may be operable to record a notification related to the determination of the buffer having one or more stale images.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

BRIEF DESCRIPTION OF FIGURES

In the drawings:
FIG. 1: a schematic representation of a video system.

DETAILED DESCRIPTION

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

The present disclosure is directed to a video system 100. Accordingly, FIG. 1 illustrates a schematic representation of an embodiment of video system 100. Video system 100 may comprise an imager 110, a buffer 120, a display 130, a controller 140, and/or a video recorder 150. In some embodiments, video system 100 may be incorporated into a vehicle.

Imager 110 may be any device configured and/or operable to capture light and generate a plurality of corresponding images. For example, imager 110 may be a camera. Accordingly, imager 110 may be a Semi-Conductor Charge-Coupled Device (CCD) or a pixel sensor of Complementary Metal-Oxide-Semi-Conductor (CMOS) technologies. In some embodiments, the images may be captured in series as a video stream. Thus, the images may be captured in accordance with a first frame rate. The first frame rate may be approximately 30 frames per second. In some embodiments, the first frame rate may be substantially constant. In other embodiments, the first frame rate may be variable. In some such embodiments, the first frame rate may vary based, at least in part, on imaging conditions. In some embodiments, the images captured by imager 110 may have a field of view corresponding to a scene exterior the vehicle. Accordingly, the field of view may correspond to a field of view traditionally associated with an interior rearview assembly, driver side exterior rearview assembly, passenger side exterior rearview assembly, or back-up camera. Thus, the scene may be rearward and/or to the side relative the vehicle.

Buffer 120 comprises a first number of memory storage slots 121. Therefore, buffer 120 may be stored in a computer memory, such as random-access memory (RAM). Further, the computer memory may be a non-transitory computer-readable media (CRM). Additionally, buffer 120 may be communicatively connected to imager 110. As used herein, "communicatively connected" may mean connected directly or indirectly though one or more electrical components. Thus, buffer 120 may be configured and/or operable to receive images from imager 110. Accordingly, buffer 120 may be configured and/or operable to sequentially and cyclically store a most current complete image received from imager 110 into one of the memory storage slots 121 at a time interval. The time interval may have a frequency. In some embodiments, the frequency may be substantially constant. Therefore, at each time interval, the most current image is stored in a storage slot 121. For example, at a first time interval, the most recent image received from imager 110 may be a first image. Thus, the first image may be stored in a first storage slot 121-1. Subsequently, at a second time interval, the most recent image received from imager 110 may then be stored in a second storage slot 121-2. In some instances, this image may again be the first image if buffer 120 has not yet completely received a second image from imager 110. Alternatively, this image may be the second image if the second image has been completely received from imager 110. The second image may be a subsequently recorded image relative the first image. This process may repeat itself through subsequent time intervals and storage slots (e.g., 121-3,121-4,121-5, ... 121-*n*) until an image is stored in the last storage slot 121-*n* of the first number of storage slots 121. Once an image is stored in the in the last storage slot 121-*n*, at the next time interval, buffer 120 may cyclically revert back to the beginning and then store the most current image in first storage slot 121-1, overwriting the first image.

Display 130 may be any device configured to and/or operable to present one or more digital images for viewing by a user or an occupant. In some embodiments, display 130 may be configured and/or operable to directly retrieve the images for presentation from buffer 120. Accordingly, display element 130 may be of LCD, LED, OLED, micro-LED, plasma, DLP, or another technology. In some embodiments, display element 130 may be disposed in a rearview assembly, such as an interior rearview assembly of the vehicle. The images presented by display 130 may be presented at a second frame rate. Thus, the images presented by display 130 may be a video stream. Additionally, the second frame rate may be substantially constant. In some embodiments, the second frame rate may be approximately 60 frames per second. Accordingly, the second frame rate may be substantially greater than the first frame rate. In some embodiments, the second frame rate may be substantially equal to the time interval frequency. In some embodiments, the first number may be determined based, at least in part, on a highest expected ratio between the first and second frame rates. Further, display 130 may be communicatively connected to buffer 120. Accordingly, the frames presented by display 130 may be retrieved sequentially and cyclically from the storage slots 121. For example, the image stored in the first storage slot 121-1 may be presented in a first frame and, subsequently, the image stored in the second storage slot 121-2 may be presented in a second frame. This may be continued until the image stored in an $n^{th}$ storage slot 121-*n* is presented in an $n^{th}$ frame. Further, after presenting the image in the $n^{th}$ storage slot 121-*n*, display 130 may cyclically come back to the first storage slot 121-1 and present the image stored therein as an n+1 frame of a video stream presented by display 130, and the process may re-progress through the storage slots 121, and so forth.

Controller 140 may be communicatively connected to imager 110, buffer 120, and/or display 130. In some embodiments, controller 140 may be configured and/or operable to receive the one or more images from imager 110. In some such embodiments, controller 140 may be configured to and/or operable to sequentially and cyclically store the most current complete image received from imager 110 into memory storage slots 121 at the time interval. In some embodiments, controller 140 may be configured and/or operable to provide display 130 with the one or more images for presentation. In some such embodiments, controller 140 may be configured and/or operable to sequentially and cyclically retrieve the one or more images from the memory storage slots 121 and relay them to display 130. Further, controller 140 may comprise a memory 141 and a processor 142.

Memory 141 be a non-transitory computer-readable media (CRM). Accordingly, memory 141 may be configured to and/or operable to store one or more instructions, such as one or more algorithms, to provide for the configuration and operation of controller 140. Examples of memory 141 include conventional hard disks, solid-state memories, random access memories (RAM), read-only memory (ROM), erasable programmable read-only memory (EPROM), electronically erasable programmable read-only memory (EEPROM), optical or magnetic disks, dynamic random-access memory (DRAM). In some embodiments, memory 141 may comprise buffer 120. In other embodiments, memory 141 and buffer 120 may be separate entities. Further, memory 141 may store one or more algorithm. The algorithm may be configured to and/or operable to detect stale images. To detect the stale images, the algorithm may be configured and/or operable to assign hash values to images added to the memory storage slots 121 of buffer 120 and/or images of each frame presented by display 130. In some embodiments, the hash may be a cyclic redundancy check hash (CRC).

The assigned hash values may be stored in the memory 141. In some embodiments, controller 140 may only store novel hash values in memory 141. Thus, in such an embodiment, controller 140 may not store repeat or duplicate hash values in memory 141. Additionally, in some embodiments, controller 140 may retain only a second number of the stored hash values. The second number of retained stored hash values, may be only the most recent stored hash values. In some embodiments, the second number may be greater than or equal to the first number. Accordingly, the second number, in some such embodiments, may be equal to the first number.

Additionally, the algorithm may be configured and/or operable to maintain a counter. Assigned hash values that match any previously assigned hash value stored in memory 141 increment the counter by one. Conversely, assigned hash values that do not match any previously assigned hash value reset the counter to zero. Further, the algorithm may be configured and/or operable to determine that one or more images in the buffer are stale based, at least in part, on the counter value exceeding the number of frames stored in buffer.

Processor 142 may be communicatively connected to memory 141. Further, processor 142 may be any device or electronic circuit configured and/or operable to process or execute one or more sets of electronic instructions, such as the algorithm. These instructions may be stored in memory 141. Examples of processor 142 may include a central processing unit (CPU), a microprocessor, and/or an application specific integrated circuit (ASIC).

In some embodiments, the algorithm may be operable to prevent stale images from being presented by display 130. Based, at least in part, on the determination of one or more of the images in buffer 120 being stale, controller 140 may prevent to the images from being presented by display 130. In some such embodiments, controller 140 may send an error notification for presentation by display 130.

Video recorder 150 may be any device configured and/or operable to record, store, and/or save a series of received images. For example, video recorder 150 may be part of a black box for a vehicle. Thus, video recorder 150 may comprise a computer memory. The computer memory may be the same as or substantially similar to memory 141. Additionally, video recorder 150 may be communicatively connected to imager 100, buffer 120, display 130, and/or controller 140. The received images may be received and saved as a video stream at a third frame rate. The video steam may comprise a series of image frames. Additionally, the third frame rate may be substantially constant. In some embodiments, the third frame rate may be approximately 60 frames per second. Accordingly, the second frame rate may be substantially greater than the first frame rate. In some embodiments, the second frame rate may be substantially equal to the time interval frequency. In some embodiments, the first number may be determined based, at least in part, on a highest expected ratio between the first and third frame rates. In some embodiments, the series of received images may be retrieved sequentially and cyclically from the storage slots 121 of buffer 120. For example, the image stored in the first storage slot 121-1 may be recorded in video recorder 150 in a first frame and, subsequently, the image stored in the second storage slot 121-2 may be recorded in a second frame. This may be continued until the image stored in an $n^{th}$ storage slot 121-$n$ is presented in an $n^{th}$ frame. Further, after recording the image in the $n^{th}$ storage slot 121-$n$, video recorder 150 may cyclically come back to the first storage slot 121-1 and record the image stored therein as an n+1 frame of the video stream recorded by video recorder 150, and the process may re-progress through the storage slots 121, and so forth. In some embodiments, video recorder 150 may be configured and/or operable to directly retrieve the images for recording from buffer 120. In other embodiments, video recorder 150 may be configured and/or operable to indirectly retrieve the images for recording from display 130. In yet other embodiment, video recorder 150 may be configured and/or operable to indirectly retrieve the images for recording from controller 140. In yet other embodiments, video recorder 150 may be a part of controller 140, such as a part of memory 141.

In some embodiments, the algorithm may be configured and/or operable to prevent stale images from being recorded by video recorder 150. Accordingly, based, at least in part, on the determination of one or more of the images in buffer 120 being stale, controller 140 may prevent the images from being recorded by video recorder 150. In some such embodiments, controller 140 may send an error notification for recordation by video recorder 150.

Embodiments of video system 100 may have one or more advantages. Video system 100 may allow for the presentation of images captured by imager 110 by display 130 when imager 110 and display 130 have different frame rates. Further, safety is greatly increased as stale video may be detected and/or prevented despite a disparity in frame rates. The disparity in frame rates between imager 110 and display 130 means that some image repetition is expected. For example, if display 130 has a frame rate twice that of imager 110, one would expect an image captured by imager 100 to be presented by display 130 roughly twice, due to display 130 advancing through two frames in the time it takes a new image to be captured by imager 110. This is further complicated in instances where the frame rate of imager 110 is variable. Thus, stale video may not be detected by the simple existence of repetition in image presentation, as false detection would commonly occur. However, the counter may allow for detecting stale video by detecting that images are repetitive in an amount greater than what may be anticipated based on the disparity in frame rates. Additionally, video system 100 may allow for video recorder 150 to record images captured by imager 110, even in instances where some video recorders 150 may require recorded video to be recorded at a different frame rate than that provided by imager 110. Further, video recorder 150 may record images captured by imager 110 at a substantially constant frame rate in contrast to a variable frame rate provided by imager 110. Additionally, only storing novel hash values may have the advantage of substantially reduced memory demands. This advantage has an increasing impact so as the disparity in frame rates increases. This is such because as the disparity in frame rate increases, the number of anticipated repetitions also increases due to the faster frame advancement of display 130 relative imager 110. These repeated images will have the same hash values. Accordingly, a smaller fraction of the assigned hashes will be stored.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A system comprising:
    a camera configured to capture a series of images at a first frame rate;
    a buffer having a first number of memory storage slots, the buffer configured to: at a frequency of time intervals, sequentially and cyclically store into the memory storage slots, the most current image received from the camera at each interval;
    a display configured to present images at a second frame rate, sequentially and cyclically from the memory storage slots; and
    a controller configured to:
        assign hash values to images of each frame displayed by the display;
        store novel hash values in a memory;
        maintain a counter, wherein:

assigning a repeat hash value increments the counter by one, and
assigning novel hash values resets the counter to zero; and
determine that one or more images in the buffer are stale based, at least in part, on the counter value.

2. The system of claim 1, wherein the controller is further configured to not store repeat hash values in the memory.

3. The system of claim 1, wherein the memory retains only a second number of the stored novel hash values such that only the most recent stored novel hash values are retained.

4. The system of claim 3, wherein the second number is greater than or equal to the first number.

5. The system of claim 4, wherein the second number is equal to the first number.

6. The system of claim 1, wherein the determination that one or more images in the buffer are stale is further based, at least in part, on the counter value exceeding the first number.

7. The system of claim 1, wherein the first frame rate is variable.

8. The system of claim 1, wherein the first frame rate is less than the second frame rate.

9. The system of claim 1, wherein the first number is determined, at least in part, on a highest expected ratio between the first and second frame rates.

10. The system of claim 1, wherein the controller is further configured to prevent stale images from being displayed by the display.

11. The system of claim 1, wherein the display is configured to display a notification related to the determination of the buffer having one or more stale images.

12. A system comprising:
a camera configured to capture a series of images at a first frame rate;
a buffer having a first number of memory storage slots, the buffer configured to: at a frequency of time intervals, sequentially and cyclically store into the memory storage slots, the most current image received from the camera at each interval;
a video recorder configured to record images at a second frame rate, sequentially and cyclically from the memory storage slots; and
a controller configured to:
assign hash values to images of each frame recorded by the video recorder;
store novel hash values in a memory;
maintain a counter, wherein:
assigning a repeat hash value increments the counter by one, and
assigning novel hash values resets the counter to zero; and
determine that one or more images in the buffer are stale based, at least in part, on the counter value.

13. The system of claim 12, wherein the controller is further configured to not store repeat hash values in the memory.

14. The system of claim 12, wherein:
the memory retains only a second number of the stored novel hash values such that only the most recent stored novel hash values are retained; and
the second number is greater than or equal to the first number.

15. The system of claim 14, wherein the second number is equal to the first number.

16. The system of claim 12, wherein the determination that one or more images in the buffer are stale is further based, at least in part, on the counter value exceeding the first number.

17. The system of claim 12, wherein the first frame rate is variable.

18. The system of claim 12, wherein the first frame rate is less than the second frame rate.

19. The system of claim 12, wherein the first number is determined, at least in part, on a highest expected ratio between the first and second frame rates.

20. The system of claim 12, wherein the controller is further configured to prevent stale images from being recorded by the video recorder.

* * * * *